Patented Oct. 22, 1946

2,409,851

UNITED STATES PATENT OFFICE 2,409,851

PERYLENE DERIVATIVES

Norman Hulton Haddock, Blackley, Manchester, England, assignor to Imperial Chemical Industries Limited, a corporation of Great Britain No Drawing. Application March 2, 1942, Serial No. 433,103. In Great Britain March 12, 1941

10 Claims. (Cl. 260—281)

This invention relates to the manufacture of new perylene derivatives containing sulphur.

These new derivatives are some of them sulphur dyes and others of them substances which, as will be explained below, can be used as sulphur dyes. They are all derivatives of perylene-3:4: 9:10-tetracarboxy-di-(phenylimides), the sulphur dyes being mercaptans and the corresponding disulhpide derivatives, and the others being thiocyano and xanthic ester derivatives. All of them, therefore, may be represented by the general formula

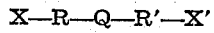

X—R—Q—R'—X' wherein Q is the radical of perylene-3,4,9,10-tetracarboxy-diimide, R, R' represent phenylene radicals selected from the group consisting of phenylene, alkyl phenylenes having not more than 4 carbon atoms in the side chain, and alkoxy-phenylenes having not more than 4 carbon atoms in the side chain, said radicals R and R' being attached to the radical Q through the N-atoms of the imide groupings, while X, X' designate radicals which are reducible by alkalimetal sulfides in alkaline medium to mercaptan radicals. The presence of these radicals causes the entire compound to become applicable to textile fiber as a sulfur dye, that is by reduction in an alkaline sulfide vat followed by oxidation on the fiber. In a more specific sense, X, X' are substituents selected from the group consisting of the thiocyanate radical (—SCN), the disulfide radical (—S—S—), and alkyl-xanthate radicals (—S—CS—O—alkyl). In the case of the disulfide radical, the second bond of the S—S group may be attached to the same perylene-diimide molecule or it may bridge two such molecules.

According to the invention we make the thiocyano and xanthic ester derivatives by tetrazotising perylene-3:4:9:10-tetracarboxy-di-(m- or p-aminophenylimides), which may carry alkyl or alkoxy substituents with not more than 4 carbon atoms, in the phenylene nuclei, and then treating the resulting tetrazotised compounds with thiocyanates or xanthates, so as to replace the diazonium subtitutents with thiocyano or xanthic ester substituents respectively.

Also according to the invention we make the mercaptans by hydrolysing the thiocyano and xanthic ester derivatives.

Also according to the invention we make the disulphide derivatives by oxidising the mercaptans. The disulphide derivatives will in general contain more than one disulphide i. e. —S.S— group, and may be formed by combination between more than two molecules of the mercaptans.

The mercaptans and the disulphide derivatives are, as stated, sulphur dyes and can be dyed from sodium sulphide vats. They yield bright red dyeings which have very good fastness to light, chemic and washing with soap at the boil. The sulphur dyes already in use do not include any which dye in red shades of as good brightness and fastness.

The thiocyano and xanthic ester derivatives are not strictly speaking dyes, but they can nevertheless be used as if they were sulphur dyes, because under the conditions of the sodium sulphide vat they are hydrolysed to the mercaptans. When so used they give dyeings like those obtained from the mercaptans and disulphide derivatives.

The invention includes the application of the new derivatives as sulphur dyes.

In making the thiocyano and xanthic ester derivatives, the tetrazotisation can be effected conveniently by dissolving the amine in concentrated sulphuric acid and adding a sulphuric acid solution of sodium nitrite. After tetrazotisation, the sulphuric acid solution may be poured on to ice and filtered, the tetrazo compound is thus obtained as a paste, which can be added to water and treated for the replacement of the diazonium substituents by thiocyano or xanthic ester substituents. When making thiocyano derivatives the filtration may conveniently be omitted. The treatment of the terazo compound with thiocyanates and xanthates is effected according to the known methods of replacing diazonium substituents with thiocyano and xanthic ester ones. Sodium thiocyanate can be conveniently used for making the thiocyano derivatives and potassium ethyl xanthate for making the xanthic ester ones. When using potassium ethyl xanthate (KS.CS.OC₂H₅)

the ethyl xanthic ester substituent (—S.CS.OC₂H₅)

is introduced. Using other esters, other corresponding ester substituents are introduced.

Hydrolysis of the thiocyano and the xanthic ester derivatives is conveniently effected with sodium sulphide. In fact as has already been mentioned, hydrolysis is effected under the conditions of use in the sodium sulphide sulphur vat. This effect is very surprising, because in the case of the simpler aryl compounds it has been our experience that their thiocyanates do not hydrolyze readily except under drastic conditions, involving for instance refluxing for six hours with very strong aqueous or alcoholic caustic soda. It is very surprising, therefore, that the relatively cool and weakly alkaline aqueous sodium-sulfide vat is capable of hydrolyzing the thiocyanates of this invention so readily as to produce a satisfactory dyeing on the fiber.

The mercaptans oxidise easily to the disulphide derivatives. In fact they are difficult to preserve as mercaptans, as they oxidise on contact with air. In manufacture, air is the most convenient oxidising agent to use, although other oxidising agents, e. g., sodium m-nitrobenzene-sulphonate may be used if desired.

For use as sulphur dyes, the disulphide derivatives appear to be the most convenient.

The following examples in which parts are by weight illustrate but do not limit the invention.

*Example 1*

5 parts of perylene-3:4:9:10-tetracarboxy-di-(m-aminophenylimide) (prepared by heating perylene-3:4:9:10-tetracarboxy anhydride with m-phenylenediamine—see British Patent No. 201,786) are dissolved in 72 parts of 98% sulphuric acid. The solution is stirred at 30° C. A solution of 1.6 parts of sodium nitrite in 7.2 parts of 98% sulphuric acid is added during a quarter of an hour and the mixture is stirred at 30° C., until diazotisation is complete. The red solution is then poured on to and stirred up with 300 parts of crushed ice. The diazonium sulphate is thus obtained as a colloidal red precipitate. To this there is added a solution of 15 parts of sodium thiocyanate in 50 parts of water and the mixture is stirred and slowly warmed to 95° C. Nitrogen is evolved during this operation. The bright red compound in suspension is filtered, washed with water and dried.

The resulting perylene-3:4:9:10-tetracarboxy-di-(m-thiocyanophenylimide) is a red powder, insoluble in water. Its structure may be expressed by the formula

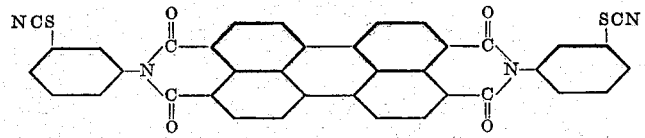

24 parts of the above thiocyano derivative are mixed with 50 parts of crystalline sodium sulphide dissolved in 1000 parts of water. The mixture is heated to the boil. A violet solution of perylene-3:4:9:10-tetracarboxy-di-(m-mercaptophenylimide) is obtained, this being probably present as a leuco derivative.

The solution is treated at about 50° C., by passing through a stream of air, when a precipitate of the disulphide derivative is formed. This precipitate is filtered off, washed with water and dried.

It is red in colour, insoluble in water, soluble in concentrated sulphuric acid with a red colour and in aqueous sodium sulphide solution with a violet colour. It dyes cotton in red shades from a sodium sulphide bath, and the dyeings have very good fastness to light, chemic and washing with soap at the boil.

*Example 2*

Products similar to those of Example 1 are obtained by using perylene-3:4:9:10-tetracarboxy-di-(p-aminophenylimide) instead of the di-(m-aminophenylimide) in the process of that example.

*Example 3*

6.4 parts of perylene-3:4:9:10-tetracarboxy-di-(m-aminophenylimide) are dissolved in 90 parts of 98% sulphuric acid below 25° C., and a solution of 2.06 parts of sodium nitrite in 18 parts of 98% sulphuric acid is added. The mixture is heated at 30-35° C., for half an hour and then poured on to 500 parts of ice and water. 100 parts of sodium chloride are added, and the bright red diazonium salt which is precipitated is filtered off and washed several times with 20% sodium chloride solution. The diazonium salt is made into a thin paste with water and gradually poured into a solution of 10 parts of potassium ethyl xanthate in 100 parts of water, keeping the temperature between 40 and 50° C., and adding sodium carbonate in small portions to keep the mixture alkaline to Brilliant Yellow paper. The red suspension is heated to 90° C., and maintained at 80-90° C., for about a quarter of an hour until the evolution of nitrogen ceases. The bright red suspension is filtered and washed alkali-free. The product is hydrolysed to the mercaptan by dissolving in aqueous sodium sulphide solution.

Either as such or after oxidising to the disulphide it yields violet shades on cotton from a sodium sulphide vat and these oxidise in the air to bright bluish-red.

In the first part of this example, the potassium ethyl xanthate may be replaced by the corresponding isopropyl or n-butyl esters.

*Example 4*

5 parts of perylene-3:4:9:10-tetracarboxy-di-(m-amino-p-methylphenylimide) (prepared by heating perylene-3:4:9:10-tetracarboxylic acid anhydride with m-toluylenediamine) are dissolved in 22 parts of 98% sulphuric acid at 25° C. A solution of 1.6 parts of sodium nitrite in 22 parts of ice-cold 98% sulphuric acid is added during a quarter of an hour and the mixture is stirred at 25° C., until diazotisation is complete. The solution is poured on to 300 parts of crushed ice and a solution of 15 parts of sodium thiocyanate in 50 parts of water is added and the mixture stirred and slowly heated to boiling. The resulting perylene-3:4:9:10-tetracarboxy-di-(m-thiocyano-p-methylphenylimide) is filtered off, washed with water and dried. It is a bright red powder insoluble in water.

20 parts of the above thiocyano derivative are stirred with a solution of 50 parts of sodium sulphide crystals in 800 parts of water and the mixture raised to the boil. The thiocyano compound dissolves completely giving a deep violent solution of the mercaptan. The solution is oxidised at 40-50° C., by air-blowing and the red precipitate of the disulphide derivative is filtered off, washed and dried.

It dissolves in sulphuric acid with a purple colour. It dyes cotton from a sulphide bath, in red shades which have very good fastness to light, chemic and wet treatments.

Sodium m-nitrobenzene sulphonate may be used instead of air in the above oxidation. Compounds corresponding to those obtained above and having very similar properties are obtained if starting materials are used carrying ethyl, propyl and butyl substituents instead of methyl.

*Example 5*

18.9 parts of perylene-3:4:9:10-tetracarboxy-di-(m-amino-p-methoxyphenylimide) (prepared by reacting perylene-3:4:9:10-tetracarboxylic acid anhydride with 2:4-diamino-anisole) are dissolved in 85 parts of 98% sulphuric acid at 25° C. A solution of 4.35 parts of sodium nitrite in 40 parts of ice-cold 98% sulphuric acid is added during a quarter of an hour and the mixture is stirred until diazotisation is complete. The solution is poured on to 900 parts of crushed ice and a solution of 45 parts of sodium thiocyanate in 75 parts of water is added and the mixture stirred and slowly heated to boiling. The resulting perylene-3:4:9:10-tetracarboxy-(m-thiocyano-p-methoxyphenylimide) is filtered off with water and dried. It is a bright red powder insoluble in water.

The thiocyano derivative can be converted to the disulphide derivative as described in Example 4. The disulphide derivative dyes cotton in bright red shades.

Compounds corresponding to those obtained above and having very similar properties are obtained if there are used as starting materials compounds carrying ethoxy, propoxy, isopropoxy and butoxy substituents instead of methoxy.

*Example 6*

5 parts of perylene-3:4:9:10-tetracarboxy-di-(m-aminophenylimide) are dissolved in 50 parts of 98% sulphuric acid and the solution poured on to crushed ice. The red precipitate is filtered off and washed free of acid. The moist paste is stirred with 800 parts of water containing 5 parts of 36% hydrochloric acid and diazotised at 0–5° C., by the addition of 1.6 parts of sodium nitrite in 10 parts of water. The red solution is filtered from a trace of suspended material and run into a solution of 20 parts of potassium isopropyl-xanthate and 20 parts of sodium carbonate in 300 parts of water at 60° C. The mixture is stirred at room temperature for one hour, warmed to 80° C., and the red precipitate filtered off and washed with water.

The ester is hydrolysed by warming to 90° C., with dilute aqueous sodium sulphide solution and the mercaptan is oxidised to the disulphide derivative as described in Example 4.

I claim:

1. A compound of the general formula $$X-R-Q-R'-X'$$

wherein Q is the radical of perylene-3,4,9,10-tetracarboxy-diimide, R, R' represent phenylene radicals selected from the group consisting of phenylene, alkyl phenylenes having not more than 4 carbon atoms in the side chain, and alkoxyphenylenes having not more than 4 carbon atoms in the side chain, said radicals R and R' being attached to the radical Q through the N-atoms of the imide groupings, while X, X' designate radicals which are reducible by alkali-metal sulfides in alkaline medium to mercaptan radicals whereby the entire compound becomes applicable to textile fiber as a sulfur dye.

2. A sulfur dye containing the nuclear structure of an N,N'-diphenyl-3,4,9,10-tetracarboxy-perylene-diimide but carrying further in said phenyl nuclei substituents which are convertible in an alkaline sulfide vat to mercapto groups, thereby dissolving the entire compound in said sulfide vat and rendering it applicable as a sulfur dye to textile fiber, said substituents being radicals selected from the group consisting of the thiocyanate radical, the disulfide radical and alkyl-xanthate radicals.

3. A composition as in claim 2, wherein the specified phenyl radicals carry further substituents selected from the group consisting of alkyl and alkyloxy of not more than 4 carbon atoms.

4. A compound of the general formula

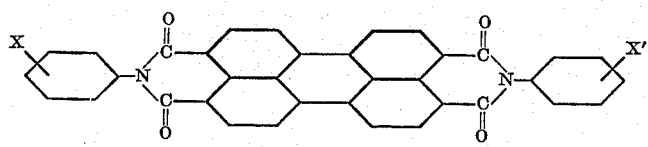

wherein X, X' represent substituents which are reducible in the manner of sulfur dyestuffs to produce mercaptan groups in solution.

5. A compound of the general formula

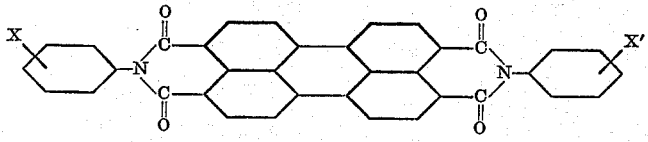

wherein X, X' stand for thiocyanate radicals.

6. A compound of the general formula

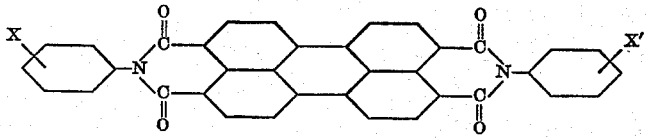

wherein X, X' stand for alkyl-xanthate radicals.

7. A compound of the general formula

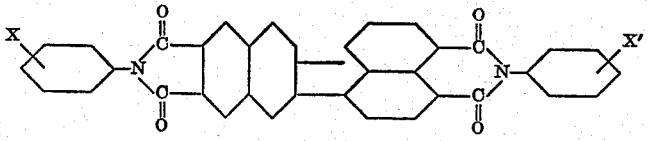

wherein X, X' stand for disulfide radicals.

8. In the process of manufacturing a sulfur dye of the perylene series, the arrangement of steps which consists of tetrazotizing a diamino-N,N'-diphenyl-3,4,9,10-perylene-tetracarboxy-diimide, and coupling the resulting bis-diazonium compound to a sulfur-containing compound of the group consisting of the alkali-metal thiocyanates and alkali-metal-alkyl-xanthates, said coupling being achieved at a moderately elevated temperature whereby the diazonium nitrogen is eliminated and radicals from the group consisting of thiocyanate and alkyl-xanthate are introduced into the phenyl nuclei.

9. A process as in claim 8 including further the step of dissolving the resulting sulfur-containing compound in an aqueous vat containing an alkali sulfide, whereby to produce a mercaptan of N,N'-diphenyl-3,4,9,10-perylene-tetracarboxy - diimide in solution.

10. A process as in claim 8 including further the steps of dissolving the resulting sulfur-containing compound in an aqueous vat containing an alkali sulfide, whereby to produce a mercaptan of N,N'-diphenyl-3,4,9,10-perylene-tetracarboxy-diimide in solution, and then subjecting the said solution to oxidation to precipitate a disulfide form of said dye.

NORMAN HULTON HADDOCK.

Certificate of Correction

Patent No. 2,409,851.                                           October 22, 1946.

NORMAN HULTON HADDOCK

It is hereby certified that error appears in the printed specification of the above numbered patent requiring correction as follows: Column 6, lines 69 to 74 inclusive, claim 7, for that portion of the formula reading

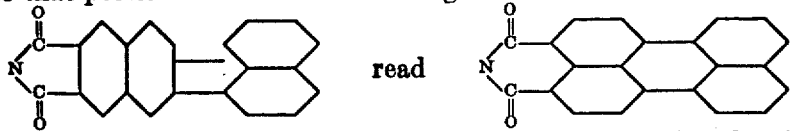

and that the said Letters Patent should be read with this correction therein that the same may conform to the record of the case in the Patent Office.

Signed and sealed this 24th day of December, A. D. 1946.

[SEAL]

LESLIE FRAZER,
*First Assistant Commissioner of Patents.*